…

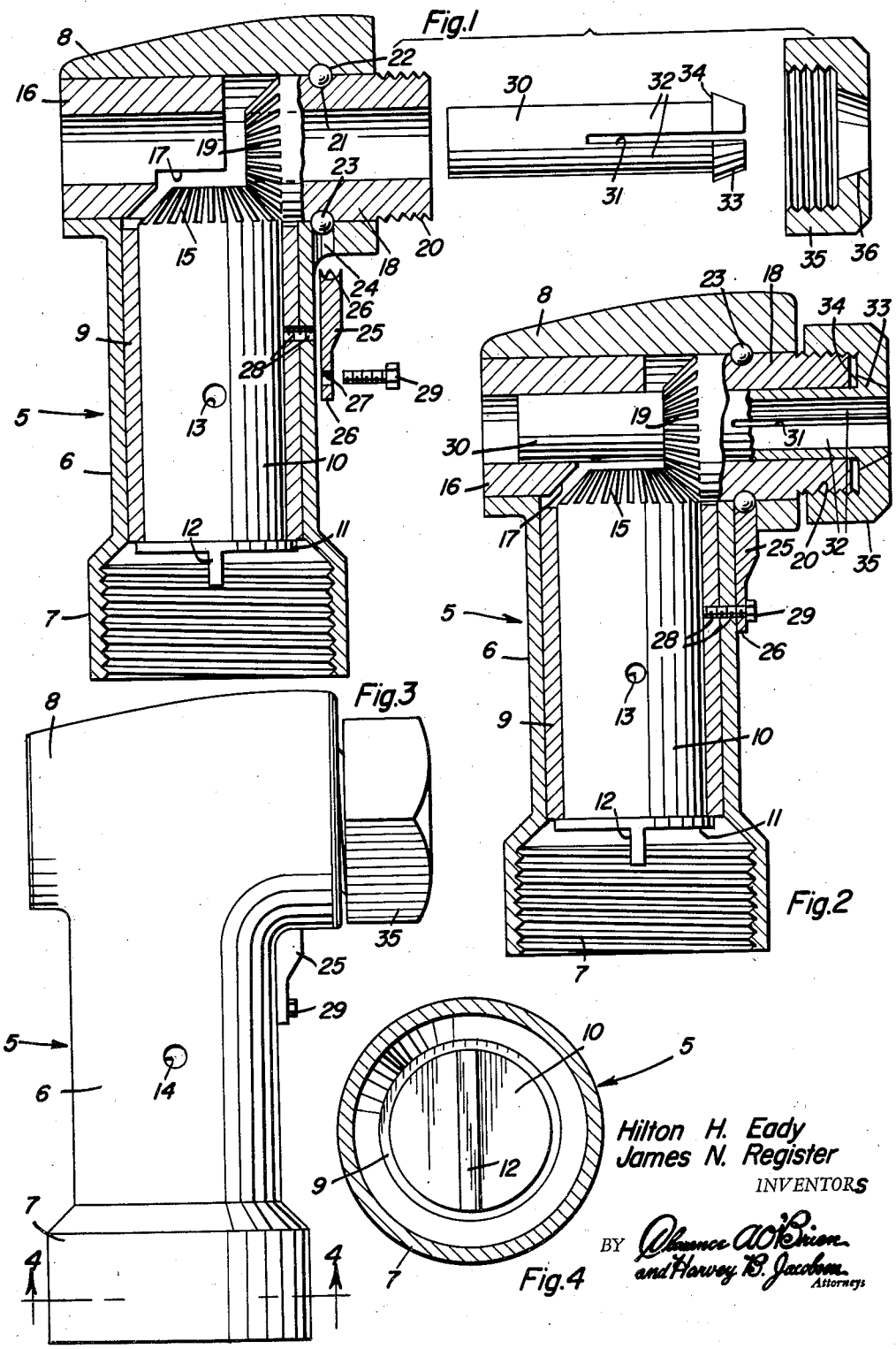

United States Patent Office 3,111,862
Patented Nov. 26, 1963

---

3,111,862
COLLET CHUCK
Hilton H. Eady, P. O. Box 19, and James N. Register, 223 Spruce St., both of Warner Robins, Ga.
Filed Feb. 8, 1961, Ser. No. 87,849
7 Claims. (Cl. 74—606)

This invention relates to new and useful improvements in collet chucks for use particularly, although not necessarily, with portable electric or pneumatic motors and has for its primary object to provide, in a manner as hereinafter set forth, a device of this character comprising a 90° power head.

Another very important object of the present invention is to provide a chuck of the character described which embodies a unique collet assembly for receiving and securing a tool or workpiece.

Still another important object of the invention is to provide a collet chuck of the aforementioned character comprising novel means for rotatably securing the collet assembly in the casing.

Another object of the invention is to provide a collet chuck of the character set forth which is especially useful in close or otherwise cramped places.

Other objects of the invention are to provide a collet chuck of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in vertical section through a collet chuck constructed in accordance with the present invention, showing certain of the parts separated;

FIGURE 2 is a vertical sectional view substantially similar to FIGURE 1 but showing the device assembled;

FIGURE 3 is a view in side elevation of the device; and

FIGURE 4 is a view in horizontal section, taken substantially on the line 4—4 of FIGURE 3.

Referring now to the drawing in detail, it will be seen that the embodiment of the invention which has been illustrated comprises a casing of suitable metal and dimensions which is designated generally by reference numeral 5. The casing 5 is adapted to be readily and removably mounted on a suitable electric or pneumatic motor (not shown). Toward this end, the casing 5 includes a cylindrical sleeve 6 comprising an enlarged, internally threaded end portion or bell 7 to be screwed on the power motor. The casing 5 further includes, on the other end of the sleeve 6 and integral therewith, a transverse tubular head 8.

Mounted in the sleeve 6 is a bushing or bearing 9. A shaft 10 is journalled in the bearing 9. The shaft 10 is provided on one end with a flange 11 which abuts the corresponding end of the bearing 9. The shaft 10 is further provided, on the flanged end thereof, with a key or tang 12 for engagement in the usual kerfed or grooved end of the spindle or shaft of the power motor for operatively connecting said shaft 10 thereto. The shaft 10 is still further provided, at an intermediate point, with a diametrically extending opening 13 which is adapted to be brought into registry with aligned openings 14 in the sleeve 6 and the bearing 9 for the reception of a pin (also not shown) when it is desired to lock said shaft 10 against rotation. At its other end, the shaft 10 terminates in a beveled gear 15. As shown to advantage in FIGURE 1 of the drawing, the gear 15 projects into the head 8 of the casing 5.

Mounted in one end portion of the head 8 of the casing 5 is a bushing or bearing 16. In the embodiment shown, the inner, lower portion of the bearing 16 is cut away, as indicated at 17, to accommodate the gear 15.

Journalled in the other end portion of the head 8 of the casing 5, in alignment with the bearing 16, is a tubular spindle 18 comprising, on its inner end, a beveled gear 19 which is meshed with the gear 15. The spindle 18 further comprises an externally threaded outer end portion 20 which projects from the head 8.

The spindle 18 and the head 8 of the casing 5 have formed therein opposed, complemental circumeferential grooves 21 and 22, respectively, defining a race for bearing balls 23. The balls 23 have the dual functions of rotatably supporting the spindle 18 and retaining the same against longitudinal movement in the head 8. An access opening 24 in the lower portion of the head 8 communicates with the grooves 21 and 22 for inserting and removing the balls 23. A closure in the form of a bar 25 is slidably insertable in the opening 24 for retaining the balls 23 in the race provided therefor. The closure 25 includes a grooved inner end 26 forming a continuation of the groove 22 for the passage of the balls 23. The closure 25 further includes a reduced lower end portion 26 having an opening 27 therein for registry with aligned openings 28 in the sleeve 6 and the bearing 9. The openings 27 and 28 receive a cap screw 29 for securing the closure 25 in position.

Mounted in the spindle 18 is a collet 30 the inner end portion of which is journalled in the bearing 16. The other end portion of the collect 30 is longitudinally split, as indicated at 31, in a manner to provide resilient jaws or the like 32. The jaws 32 receive and frictionally grip a tool or workpiece therebetween. At its outer or forward end the collet 30 terminates in a generally frusto-conical head 33 providing a shoulder 34 for abutting engagement with the opposed end of the spindle 18. A cap nut 35 is threaded on the end portion 20 of the spindle 18 for closing the jaws 32 and for frictionally connecting the collet 30 to said spindle. Toward this end, the cap nut 35 is provided with a tapered opening 36 which receives the head 33 and closes the jaws 32 in an obvious manner.

It is thought that the operation of the device will be readily apparent from a consideration of the foregoing. Briefly, the end portion 7 of the casing 5 is screwed on a suitable portable power motor to the drive spindle or shaft of which the shaft 10 is operatively connected through the medium of the tang or key 12. With the nut 35 backed off or loosened, a workpiece or tool is inserted in the split collet 30. The nut 35 is then tightened for contracting the split end portion of the collet 30 on the tool or workpiece for frictionally securing the same. When the nut 35 is tightened the shoulder 34 is also pressed against the opposed end of the spindle 18. The construction and arrangement is such as to provide a friction drive from the spindle 18 through the nut 35 and the collect 30 to the tool or workpiece. To facilitate turning the nut 35, the openings 13 and 14 are brought into registry and a pin (not shown) is inserted therein for locking the shaft 10 and the spindle 18 against rotation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. A collet chuck comprising a T-shaped casing hav- ing a sleeve and a tubular member, mounted upon, communicating with and extending transversely of said sleeve, said sleeve on its outer end having a diametrically enlarged internally threaded hollow portion for mounting the sleeve on a supporting means and defining a chamber, a shaft journaled in said sleeve and having one end extending into said tubular member and its other end extending into said chamber and having therein means for drivingly connecting it to a drive means, a tubular spindle journaled in said tubular member and having one end thereof disposed in alignment with said sleeve, said tubular spindle and shaft being beveled at their adjacent ends and having engaging teeth formed in their bevels, a hollow bearing disposed in the other end of said tubular member and having a cut-away portion for receiving therethrough said beveled end of said shaft, said bearing and spindle having aligned bores of the same diameter, a collet mounted in said bearing and spindle and having a head on one end of said collet disposed outwardly of said tubular member and spindle, means for frictionally securing said collet in said spindle for rotation therewith, complementary bearing grooves in said tubular member and said tubular spindle, ball bearings disposed in said grooves, an admission port opening into said grooves for moving said balls therethrough, a closure for said port.

2. The combination of claim 1 wherein said closure includes a groove registrable with and forming a continuation of the groove in said tubular member.

3. The combination of claim 2 including fastening means engaging said closure and said sleeve.

4. A collet chuck comprising a T-shaped casing having a sleeve and a tubular member, mounted upon, communicating with and extending transversely of said sleeve, said sleeve on its outer end having a diametrically enlarged internally threaded hollow portion for mounting the sleeve on a supporting means and defining a chamber, a shaft journaled in said sleeve and having one end extending into said tubular member and its other end extending into said chamber and having therein means for drivingly connecting it to a drive means, a tubular spindle journaled in said tubular member and having one end thereof disposed in alignment with said sleeve, said tubular spindle and shaft being beveled at their adjacent ends and having engaging teeth formed in their bevels, a hollow bearing disposed in the other end of said tubular member and having a cut-away portion for receiving therethrough said beveled end of said shaft, said bearing and spindle having aligned bores of the same diameter, a collet mounted in said bearing and spindle and having a head on one end of said collet disposed outwardly of said tubular member and spindle, means for frictionally securing said collet in said spindle for rotation therewith, aligned ports in said shaft and sleeve, a locking pin insertable through said aligned ports.

5. A collet chuck comprising an angulated casing consisting of a generally cylindrical sleeve with a transverse tubular member projecting laterally from one end thereof, said sleeve having a bore opening from its other end and communicating with the interior of said tubular member, a tubular spindle journaled in said tubular member and having an end disposed in said bore at the adjacent side of the latter, a bearing member disposed in said tubular member on the other end of and projecting into said more and terminating in axially spaced relation to said spindle, said bearing member and said tubular spindle having aligned passages, a collet having a shaft mounted in said bearing member and tubular spindle and being drivingly connected to the latter, a drive shaft journalled in said bore and extending into said tubular member, meshing gears on said shaft and tubular spindle, complementary annular bearing grooves in the exterior surface of said tubular spindle and the interior surface of said tubular member, ball bearings disposed in said complementary grooves, a ball bearing access passage in said casing communicating with said complementary grooves together with a closure for said access passage.

6. The combination of claim 5 wherein said bearing member has a cut-away portion providing clearance in said tubular member for said drive shaft gear.

7. The combination of claim 6 wherein said collet has its gear intermediate its ends, the ends of said collet being journaled in said tubular spindle and in said bearing member on opposite sides of said bore.

References Cited in the file of this patent

UNITED STATES PATENTS

| | | |
|---|---|---|
| 1,701,172 | Brown | Feb. 5, 1929 |
| 2,132,088 | Torbert | Oct. 4, 1938 |
| 2,262,706 | Benda | Nov. 11, 1941 |
| 2,414,637 | Crump | Jan. 21, 1947 |
| 2,583,831 | Goergen | Jan. 29, 1952 |